Nov. 17, 1959 J. P. ECKERT, JR 2,913,594

QUARTER ADDER

Filed Sept. 24, 1954

INVENTOR

JOHN PRESPER ECKERT, JR.

BY [signature]

ATTORNEY

United States Patent Office 2,913,594

Patented Nov. 17, 1959

2,913,594

QUARTER ADDER

John Presper Eckert, Jr., Philadelphia, Pa., assignor to Sperry Rand Corporation, a corporation of Delaware Application September 24, 1954, Serial No. 458,038

19 Claims. (Cl. 307—88)

The present invention relates to computing devices and is more particularly concerned with an improved circuit and apparatus capable of performing quarter addition, primarily in binary digital applications.

The operation known as "quarter addition" is best defined by a truth table, as follows:

| Input A | Input B | Output |
|---|---|---|
| 1 | 1 | 0 |
| 1 | 0 | 1 |
| 0 | 1 | 1 |
| 0 | 0 | 0 |

In short, when binary digital notation is employed, quarter addition is the process whereby the presence of one only of two possible inputs effects an output, while the simultaneous presence or absence of the said two inputs produces no output. Quarter addition is distinguished from half addition, for instance, in that quarter addition obtains a sum only, without a "carry," while half addition obtains both a "sum" and "carry."

Quarter adders form a basic component in many forms of computing apparatus. In the past, such quarter adders have normally utilized vacuum tube circuitry and the use of such circuitry has been accompanied by the disadvantage that the said quarter adders have been relatively fragile and subject to breakage and to normal operating failures, and, further, that they have been relatively large in size. These factors raised serious questions in respect to disposition of components as well as of maintenance and the cost attendant thereto.

In order to obviate the foregoing difficulties, other forms of electrical devices have been suggested for use as quarter adders, and one such other form is the magnetic amplifier. It is with this type of component that the present invention is primarily concerned.

It is accordingly an object of the present invention to provide a novel quarter adder utilizing a magnetic amplifier as a basic portion thereof.

A further object of the present invention resides in the provision of a quarter adder which is both inexpensive to construct and which exhibits considerable ruggedness.

A still further object of the present invention resides in the provision of a quarter adder which can be made in relatively small sizes. In this respect it should be noted that the magnetic amplifier to be disclosed may be combined with semi-conductor diodes whereby the overall quarter adder can assume an extremely small size.

Still another object of the present invention resides in the provision of a novel quarter adder which uses fewer components, and components which are more reliable in construction and operation, than has been the case heretofore.

In accordance with the foregoing objects and advantages, the present invention utilizes a magnetic amplifier structure comprising a core of magnetic material having plural windings thereon. The said magnetic amplifier, as will be discussed in more detail subsequently, may be either a carrier type magnetic amplifier or a pulse type magnetic amplifier. In either case one of the said windings is energized from a power source and two further windings (or a single center-tapped further winding) are so interconnected by diode devices to sources of input pulses that the output of the said amplifier conforms to the truth table given previously.

The foregoing objects, advantages, construction and operation of my device will be more readily seen from the following description and accompanying drawings, in which.

Figures 1, 2:
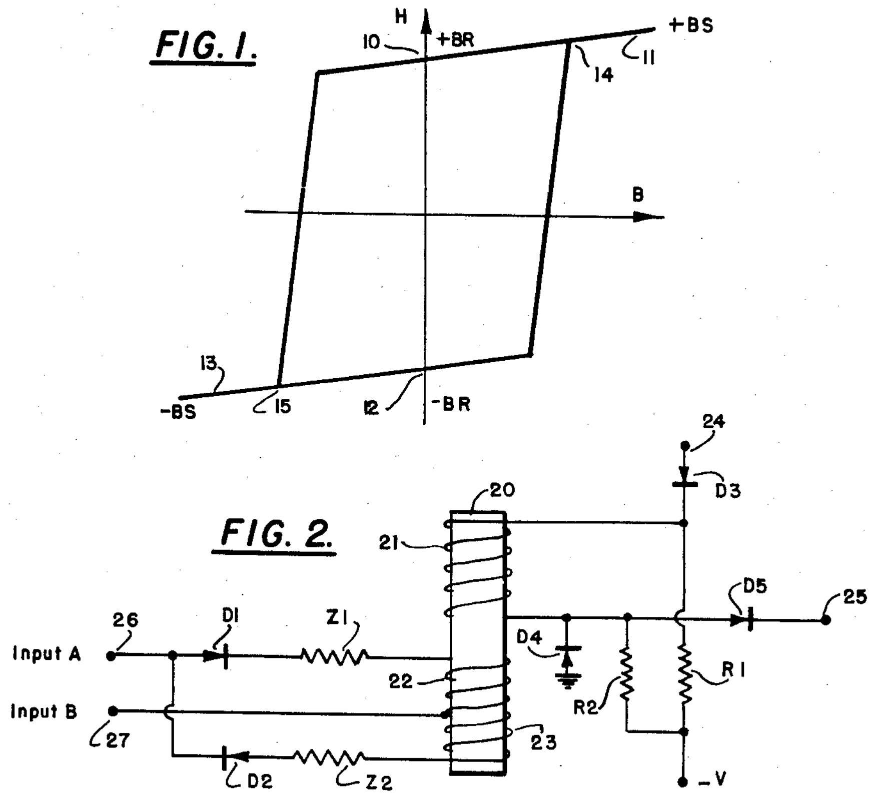
Figure 1 is an idealized hysteresis loop of a magnetic material which may preferably be employed in the cores of quarter adders constructed in accordance with the present invention.
Figure 2 is a schematic diagram illustrating a simple quarter adder in accordance with the present invention.

Referring now to Figure 1, it will be seen that magnetic amplifiers such as may be utilized in the present invention may preferably but not necessarily utilize magnetic cores exhibiting a substantially rectangular hysteresis loop. Such cores may be made of a variety of materials, among which are the various types of ferrites and various kinds of magnetic tapes, including Orthonik and 4–79 Moly-Permalloy. These materials may be given different heat treatments to effect different desired properties. In addition to the wide variety of materials applicable, the cores of the magnetic amplifier to be discussed may be constructed in a number of different geometries including both closed and open paths. For example, cup-shaped cores, strips of material, or toroidal cores are possible. It must be emphasized, however, that the present invention is not limited to any specific geometries of its cores nor to any specific materials therefor; and the examples to be given are illustrative only.

In the following description a bar type core has been utilized for ease of representation and for facility in showing winding directions. The particular type core shown may in fact be considered to represent the end view of a toroidal core. Further, the following description refers to the use of materials having substantially rectangular hysteresis loops. This is again for ease of discussion only. However, neither the precise core configuration nor the precise hysteretic material of the core is mandatory, and many variations will readily suggest themselves to those skilled in the art, in accordance with the principles to be set forth hereinafter.

Referring now to the hysteresis loop shown in Figure 1, it will be noted that that curve exhibits several significant points of operation: namely, point 10 (+Br), which represents a point of plus remanence; point 11 (+Bs), which represents plus saturation; the point 12 (−Br), which represents minus remanence; the point 13 (−Bs), which represents minus saturation; the point 14 which represents the beginning of the plus saturation region; and the point 15 which represents the beginning of the minus saturation region.

Discussing for the moment the operation of a device utilizing a core exhibiting a hysteresis loop such as has been shown in Figure 1, let us assume that a coil is wound on the said core. If we should further initially assume that the core is at an operating point 10 (plus remanence), and if a voltage pulse is applied to the coil which produces in the said coil a current creating a magnetomotive force in a direction tending to increase the flux in the said core (i.e. in a direction of +H), the core will tend to be driven from the point 10 (+Br) to point 11 (+Bs). During this state of operation there is relatively little flux change through the said coil and the coil therefore presents a relatively low impedance whereby energy fed to the said coil during this state of operation will pass readily therethrough and may be utilized to effect a usable output.

On the other hand, if the core should initially be at point 12 (−Br) prior to the application of the said +H pulse, upon application of such a pulse the core will tend to be driven from the said point 12 (−Br) to the region of plus saturation. The pulse magnitude should preferably be so selected that the core is driven only to the beginning of the plus saturation region, namely, to point 14. During this particular state of operation, there is a very large flux change through the said coil and the coil therefore exhibits a relatively high impedance to the applied pulse. As a result, substantially all the energy applied to the coil when the core is initially at −Br will be expended in flipping the core from point 12 to the region of plus saturation (preferably to point 14) and thence to point 10, with very little of this energy actually passing through the said coil to give a usable output. Thus, depending upon whether the core is initially at point 10 (+Br) or at point 12 (−Br), an applied pulse in the +H direction will be presented respectively with either a low impedance or a high impedance and will effect either a relatively large output or a relatively small output.

These considerations are of value in the construction of a quarter adder utilizing a magnetic amplifier such as is disclosed by the present invention.

Referring now to Figure 2, it will be seen that a quarter adder in accordance with the present invention comprises a core 20 preferably, but not necessarily, exhibiting a hysteresis loop similar to that discussed in reference to Figure 1. The core 20 bears three windings thereon, namely, a winding 21 which is termed the power or output winding and two windings 22 and 23 which may be termed signal or input windings. It should be noted that the said windings 22 and 23 may in fact comprise portions of a single center-tapped winding and in the subsequent discussion and claims, when reference is made to two signal or input windings, this alternate construction is meant to be included within the language thereof.

Figure 3:
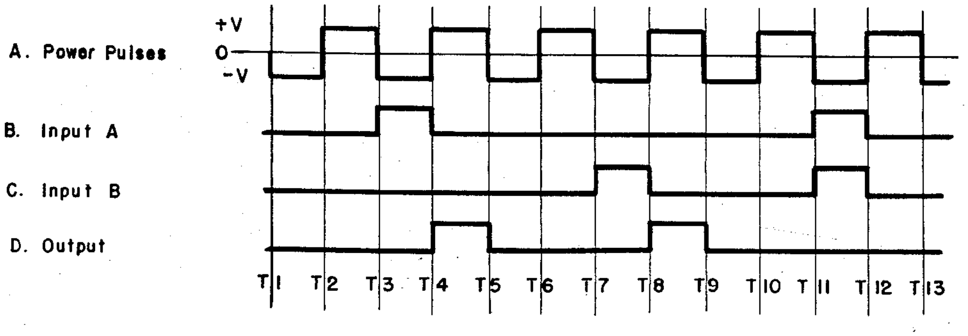
Figure 3 (A through D) are waveforms illustrating the operation of the quarter adder shown in Figure 2 when the magnetic amplifier shown therein is of the pulse type.

One end of the power winding 21 is coupled to a diode D3 poled as shown and the said diode D3 is in turn connected to a power input terminal 24 supplied with either a train of positive and negative going power pulses such as are shown in Figure 3A (in which case the amplifier is termed a pulse type magnetic amplifier), or with a source of alternating carrier wave potential relatively high in frequency in respect to the frequency of the input signals (in which further case the amplifier is termed a carrier wave type amplifier).

Assuming for purposes of the present discussion that a pulse type amplifier is in fact employed, the power pulses coupled to the said one end of winding 21 preferably have, as shown, a center value of zero volts and exhibit excursions between plus and minus V volts. The other end of power or output winding 21 is coupled via a diode D5 to an output terminal 25. One end of the signal or input winding 22 is coupled via an impedance Z1 and a diode D1 to an input terminal 26 to which terminal is selectively coupled a first source of pulses, designated in Figure 3B as Input A. The other end of the said input winding 22 is coupled to one end of the signal winding 23 and is also connected to a further input terminal 27, termed in Figure 3C as Input B. The lowermost end of signal or input winding 23 is coupled through a further impedance Z2 and a diode D2 to the first input terminal 26. Diodes D1 and D2 are oppositely poled with respect to input terminal 26 and the function of this diode disposition will become apparent from the following discussion.

Assuming now that the core 20 is initially at minus remanence (point 12 of Figure 1), a positive going power pulse applied at terminal 24 during the time *t2* to *t3* will tend to drive the said core from its minus remanence point 12 to point 14, the beginning of the plus saturation region, and at time *t3* the core 20 will find itself at its operating point 10, +Br. Disregarding for the moment any of the input signals which might selectively appear at either Input A or Input B, during the next succeeding time period, namely time *t3* to *t4*, a reverse current will flow from ground through diode D4, through the said winding 21 and thence through resistor R1 to the source of negative potential −V. The magnitude of this current is so chosen that the core 20 will tend to be flipped, during the time interval *t3* to *t4*, from its operating point 10 to point 15 and thence to its operating point 12, preparatory to reception of the next positive going power pulse at the input terminal 24. This next positive going power pulse occurring, for instance, during the time interval *t4* to *t5*, will again merely drive the core from point 12 to point 10. During such a state of operation therefore and again in the absence of any input at either terminal 26 or terminal 27, the core 20 will be caused to merely traverse its hysteresis loop and no useful output will appear at terminal 25. The amplifier thus will not produce an output in the absence of an input thereto, and such as amplifier is termed a non-complementing magnetic amplifier.

If we should now assume that an input pulse appears at the signal input terminal 26 during the time interval *t3* to *t4*, for instance, (Figure 3B), this input pulse will cause a current to flow through diode D1, impedance Z1, signal winding 22 and thence to terminal 27. The current so flowing through winding 22 during the time interval *t3* to *t4* will produce a magnetomotive force in opposition to that effected by the reverse current flow through winding 21 via diode D4 and resistor R1 during this same period of time. As a result of this input pulse during the time *t3* to *t4*, therefore, the core 20 will remain at its operating point 10 (plus remanence) during time interval *t3* to *t4*, and the application of the next positive going power pulse from input terminal 24 during the time interval *t4* to *t5* will cause the core 20 to be driven from operating point 10 to point 11 (plus saturation), thereby effecting an output signal at output terminal 25. At time *t5* the core 20 will once more move to the operating point 10, and in the absence of a signal during the time interval *t5* to *t6* the reverse current flow through winding 21, discussed previously, will cause the core 20 to be flipped from point 10 to the point 12 whereby no signal output will appear during the next succeeding positive going power pulse occurring during the time *t6* to *t7*.

If a further input pulse should now appear at the signal input terminal 27 during the time interval *t7* to *t8* (Figure 3C), this further input pulse will cause current to flow through the winding 23 and thence through impedance Z2 and diode D2 to input terminal 26. This current flow through winding 23 will produce a magnetomotive force opposing the magnetizing effect of the reverse current flow through winding 21 during this same time interval, and therefore a further output will appear at the output terminal 25 during the time interval *t8* to *t9*. If no further signal input pulse appears at either terminal 26 or terminal 27 during the time interval *t9* to *t10*, the reverse current flow through winding 21 will once more flip the core 20 to its minus remanence operating point 12, and no output will appear at terminal 25 during the time interval *t10* to *t11*.

If now input pulses should appear at both terminal 26 and terminal 27 during the time interval *t11* to *t12* (Figures 3B and 3C), the input potential of each of points 26 and 27 will be similarly raised. As a result, substantially no signal input current will flow through either winding 22 or winding 23 during this time interval and the reverse current flow through winding 21 during the said time interval $t11$ to $t12$ will, as before, cause the core 20 to be flipped from its plus remanence point 10 to its minus remanence point 12 during this time interval, whereby no output will appear at terminal 25 during the time interval $t12$ to $t13$.

Summarizing the foregoing, it will be seen that whenever an input signal is applied to either winding 22 or winding 23 during the occurrence of a negative going power pulse applied at power terminal 24, the device of Figure 2 will produce an output at output terminal 25 during the next succeeding positive going power pulse. If, however, no input should appear at either terminal 26 or 27 during the application of a negative going power pulse, or if signal inputs should be applied to both signal input terminals during the application of a negative going power pulse, no output will appear at the terminal 25 during the next succeeding positive going power pulse. This state of operation complies with the truth table discussed previously and, therefore, the device acts as a quarter adder.

Several further design considerations should be noted. Thus, when no input signal has been applied to terminal 26 or to terminal 27, or when there has been a simultaneous application of signals at each of terminals 26 and 27, during the occurrence of a negative going power pulse at terminal 24, the device will not produce a usable output during the next succeeding positive going power pulse. As a practical matter, however, during this next succeeding positive going power pulse the core 20 is being flipped from its operating point 12 (−Br) to its operating point 10 (+Br), and a small output, normally termed a "sneak" output, would in fact appear at the output terminal 25 in the absence of suppression thereof. Such suppression is effected, however, by the resistor R2 coupled between the source of negative potential −V and the lower end of power winding 21, in combination with the diode D4, previously discussed. This suppression is accomplished by so choosing the value of resistor R2 that a current normally flows from ground through diode D4 and thence through resistor R2 to the source of negative potential −V, which current has a magnitude equal to or greater than the value of sneak output to be suppressed. As a result of this configuration, therefore, only outputs which are substantially larger than the sneak output may appear at output terminal 25.

Again, current flow through the winding 21 will, in the absence of other circumstances, establish flux changes tending to induce a voltage in the signal or input windings 22 and 23. The impedances Z1 and Z2 are accordingly provided in series with the windings 22 and 23, respectively, to limit current flow due to voltages induced in the said windings 22 and 23 by current flowing through winding 21. The nature of these impedances Z1 and Z2 will depend upon the mode of operation of the device. Thus, if the device is in fact to be operated as a pulse type magnetic amplifier, such as has been described, the impedances may be resistors. However, as has been discussed previously, the quarter adder shown in Figure 2 may in fact be so energized that the magnetic amplifier portion thereof acts as a single ended carrier type magnetic amplifier. When such operation is employed, the power or carrier potentials applied to the terminal 24 are of a high frequency in comparison to the frequency of signals at Input A and/or Input B. Thus, under this latter operating condition, the impedances Z1 and Z2 preferably comprise a low pass or band stop filter such as a choke or LC circuit. Again, as has been discussed previously, when an input signal is applied to one only of the signal input terminals 26 and 27, current flows from the said input terminal through the appropriate signal or input winding and thence to the other of the input terminals. Accordingly, the signal sources connected to both Input A and to Input B should be low impedance sources and in this respect a low impedance source is defined as one capable of receiving a reverse current flow at its output terminals.

While I have discussed a preferred embodiment of my invention, it must be emphasized that the foregoing discussion is illustrative only and is not meant to be limitative of my invention. Further variations will suggest themselves to those skilled in the art, in accordance with the principles discussed above, and these variations are meant to fall within the scope of my invention as set forth in the appended claims.

Having thus described my invention, I claim:

1. A quarter adder comprising a core of magnetic material having a power winding and first and second signal windings thereon, a source of regularly occurring power pulses coupled to said power winding for regularly effecting current flow in a first direction through said power winding, means coupled to said power winding and causing a direct current flow through said power winding in a second direction opposite to said first direction during time intervals between said power pulses, a first signal source coupled to said first signal winding, and a second signal source coupled to said second signal winding, said first signal winding and said second signal winding being linked to said core and coupled to their respective signal sources in manner to provide a magnetomotive force in opposition to that produced by said direct current flow through said power winding only upon application of a signal from one or the other but not both of said first or second signal sources.

2. A quarter adder comprising a magnetic amplifier including a magnetic core having a power winding and first and second signal windings thereon, a source of regularly occurring power pulses coupled to said power winding for producing a regularly occurring magnetomotive force in a first direction in said core, reverting means coupled to said core for producing a magnetomotive force in a second direction opposite to said first direction at times intermediate the occurrence of said power pulses, a first signal source coupled to one end of said first signal winding, a second signal source coupled to one end of said second signal winding, said first and second signal sources individually being selectively operable at times intermediate the occurrence of said power pulses to produce a magnetomotive force in said core in opposition to that effected by said reverting means, means connecting said one end of said second signal winding to the other end of said first signal winding, and means coupling the other end of said second signal winding to said first signal source.

3. The combination of claim 2 including first rectifier means interposed between said first signal source and said one end of said first signal winding, and second rectifier means interposed between said other end of said second signal winding and said first signal source, said first and second rectifiers being oppositely poled with respect to said first signal source.

4. The combination of claim 3 wherein said first and second signal sources are each low impedance sources.

5. The combination of claim 4 wherein said core comprises a magnetic material exhibiting a substantially rectangular hysteresis loop.

6. The combination of claim 2 wherein said magnetic amplifier is a pulse-type amplifier, first current-limiting resistor means interposed between said first signal source and said one end of said first signal winding, and second current-limiting resistor means interposed between said first signal source and said other end of said second signal winding.

7. The combination of claim 2 wherein said magnetic amplifier is a carrier-type amplifier, a first low-pass filter interposed between said first signal source and said one end of said first signal winding, and a second low-pass filter interposed between said first signal source and said other end of said second signal winding.

8. A quarter adder comprising a magnetic core having a power winding and first and second signal windings thereon, a source of power pulses coupled to one end of said power winding, means coupled to said power winding and selectively causing a direct current flow therethrough in a direction opposite to that caused by said power pulses, a first signal source coupled via first rectifier means and first impedance means to one end of said first signal winding, means connecting the other end of said first signal winding to one end of said second signal winding, a second signal source coupled to said one end of said second signal winding, and means including second rectifier means and second impedance means for connecting the other end of said second signal winding to said first signal source.

9. The quarter adder of claim 8 wherein said first and second signal sources are low impedance sources.

10. The quarter adder of claim 8 wherein said first and second rectifiers are oppositely poled with respect to said first impedance source.

11. The quarter adder of claim 10 wherein said core comprises a magnetic material exhibiting a substantially rectangular hysteresis loop.

12. The quarter adder of claim 8 wherein said first and second impedance means each comprises a resistor.

13. The quarter adder of claim 8 wherein said first and second impedance means each comprises a low-pass filter.

14. In a magnetic control circuit, a core of magnetic material exhibiting a substantially rectangular hysteresis loop, said core having power winding means and signal winding means thereon, a source of spaced power pulses coupled to said power winding means for effecting a first magnetomotive force in a first direction in said core, reverting means coupled to said core for effecting a second magnetomotive force in a second direction opposite to said first direction in said core at times intermediate the occurrence of said power pulses whereby said first and second alternately occurring magnetomotive forces normally cause said core to be driven about its hysteresis loop, a first signal source coupled to said signal winding means and selectively operable at times intermediate the occurrences of said power pulses for effecting current flow in said signal winding means thereby to effect a magnetomotive force in opposition to said second magnetomotive force, a second signal source coupled to said signal winding means and selectively operable at times intermediate the occurrences of said power pulses for effecting current flow in said signal winding means thereby to effect a magnetomotive force in opposition to said second magnetomotive force, whereby occurrence of a signal from one or the other of said first and second signal sources substantially nullifies the said second magnetomotive force, said first and second signal sources being coupled to spaced points on said signal winding means whereby the coincident presence or absence of signals from said first and second signal sources produces no resultant current flow in said signal winding means.

15. The combination of claim 14 wherein said signal winding means comprises a center-tapped signal winding, said first signal source being coupled to one end of said signal winding, said second signal source being coupled to said center-tap, and means coupling the other end of said signal winding to said first signal source.

16. The combination of claim 15 wherein said first signal source is coupled to the opposing ends of said signal winding via oppositely poled rectifiers respectively.

17. In a magnetic control circuit, a non-complementing magnetic amplifier having an input and an output, said input comprising a center-tapped input winding, said amplifier including means responsive to a resultant current flow in said input winding for producing a signal at said output, first signal means coupled via first rectifier means to one end of said input winding, second rectifier means coupling the other end of said input winding to said first signal means, said first and second rectifier means being poled in opposite directions to one another with respect to said first signal means, and second signal means coupled to said center-tap, whereby a signal from one or the other of said first and second signal means effects a resultant current flow in said input winding, and coincident presence or absence of signals from said first and second signal means produces no resultant current flow in said input winding.

18. A quarter adder comprising a core of magnetic material having a power winding and first and second signal windings thereon, a source of regularly occurring power pulses coupled to said power winding for regularly effecting current flow in a first direction through said power winding, means coupled to said power winding and causing a direct current flow through said power winding in a second direction opposite to said first direction during time intervals between said power pulses, a first signal source coupled to said first signal winding, a second signal source coupled to said second signal winding, and means interconnecting said first and second signal windings whereby current flow in either of said first and second signal windings due to application of a signal from the respective signal source coupled thereto effects a magnetomotive force in opposition to that produced by said direct current flow to said power winding and whereby no resultant current flows in said first and second signal windings upon simultaneous application thereto of signals from both said first and second signal sources.

19. A quarter adder comprising a core of magnetic material exhibiting a substantially rectangular hysteresis loop and having a power winding and first and second signal windings thereon, a source of regularly occurring power pulses coupled to said power winding for regularly effecting current flow in a first direction through said power winding, means coupled to said power winding and causing a direct current flow through said power winding in a second direction opposite to said first direction during time intervals between said power pulses, a first signal source coupled to said first signal winding, a second signal source coupled to said second signal winding, and means interconnecting said first and second signal windings whereby current flow in either of said first and second signal windings due to application of a signal from the respective signal source coupled thereto effects a magnetomotive force in opposition to that produced by said direct current flow to said power winding and whereby no resultant current flows in said first and second signal windings upon simultaneous application thereto of signals from both said first and second signal sources.

References Cited in the file of this patent

UNITED STATES PATENTS

| | | |
|---|---|---|
| 2,666,151 | Rajchman et al. | Jan. 12, 1954 |
| 2,695,993 | Haynes | Nov. 30, 1954 |
| 2,709,798 | Steagall | May 31, 1955 |
| 2,776,380 | Andrews | Jan. 1, 1957 |